(12) United States Patent
Gao et al.

(10) Patent No.: US 6,972,162 B2
(45) Date of Patent: *Dec. 6, 2005

(54) SOLID POLYMER ELECTROLYTE FUEL CELL UNIT

(75) Inventors: Yunzhi Gao, Saitama-ken (JP); Akira Kunimoto, Saitama-ken (JP)

(73) Assignee: Kabushiki Kaisha Riken, Saitama-ken (JP)

( * ) Notice: Subject to any disclaimer, the term of this patent is extended or adjusted under 35 U.S.C. 154(b) by 310 days.

This patent is subject to a terminal disclaimer.

(21) Appl. No.: 10/388,496

(22) Filed: Mar. 17, 2003

(65) Prior Publication Data

US 2003/0175570 A1    Sep. 18, 2003

(30) Foreign Application Priority Data

Mar. 15, 2002    (JP) .............................. 2002-073225

(51) Int. Cl.[7] .............................................. H01M 4/86
(52) U.S. Cl. ...................................................... 429/41
(58) Field of Search ............................. 429/30, 40, 41

(56) References Cited

FOREIGN PATENT DOCUMENTS

| JP | 10-255823 | 9/1998 |
|---|---|---|
| JP | 10-308226 | 11/1998 |

*Primary Examiner*—Patrick Joseph Ryan
*Assistant Examiner*—Thomas H. Parsons
(74) *Attorney, Agent, or Firm*—Browdy and Neimark, PLLC

(57) ABSTRACT

A low-cost solid polymer electrolyte fuel cell unit including a metal separator is provided. The cell unit has a structure that may have high corrosion resistance and durability. The solid polymer electrolyte fuel cell unit includes a polymer electrolyte membrane, a pair of gas-diffusible electrodes fixed at opposing surfaces of the polymer electrolyte membrane, a pair of gas-diffusible porous conductive graphite collectors fixed in contact with the outer sides of the electrodes; a pair of aluminum separators for introducing a fuel gas and an oxygen-containing gas to the electrodes separately from one another, and porous conductive buffer layers provided between the separator and the graphite collector, and having flexibility and air permeability. The separator surfaces in contact with the buffer layers are each provided with a conductive coating having a thickness in the range from 0.01 $\mu$m to 20 $\mu$m.

16 Claims, 3 Drawing Sheets

SOLID POLYMER ELECTROLYTE FUEL CELL UNIT

FIELD OF THE INVENTION

The present invention relates to a solid polymer electrolyte fuel cell unit to be used as a vehicle fuel cell, particularly to a solid polymer electrolyte fuel cell unit whose electricity generation performance does not degrade with the use of a metal separator.

DESCRIPTION OF PRIOR ART

A fuel cell can efficiently convert fuel into energy without discharging toxic substances such as SOx and NOx and greenhouse gases such as $CO_2$. Therefore, attracting much attention as a new generation of a generator, the fuel cell has been widely studied and developed. Of known fuel cells, the fuel cell referred to as a polymer ion exchange membrane fuel cell or a solid polymer electrolyte fuel cell operates in a temperature range not higher than 150° C. and has high power density. Therefore, this type of fuel cell can be formed into a small size device and is a suitable power source for home use or for use in a vehicle. For this reason, the solid polymer electrolyte fuel cell has been extensively researched and developed recently, and is expected to be put into commercial use within several years.

A solid polymer electrolyte fuel cell usually includes a fluororesin-based ion exchange membrane (such as Nafion®) having a sulfonic group as a solid polymer electrolyte membrane. A fuel electrode and an oxygen (air) electrode are secured on the opposing surfaces of the electrolyte membrane and a single cell is thus completed.

Each electrode is typically made of carbon black having water repellent PTFE particles and rare metal particles dispersed therein. The rare metal particles serve as a catalyst. The cells are stacked through a plate-shaped separator provided with gas-flowing grooves so that the fuel gas and air are homogeneously supplied on both surfaces of each cell, and thus a fuel cell stack is formed (see FIG. 3).

When a solid polymer electrolyte fuel cell having the configuration described above operates, the hydrogen gas is oxidized to protons, discharging electrons. The protons come into the polymer electrolyte, are bonded with water molecules to form $H_3O^+$, and move toward the anode. The electrons generated by the oxidization of the hydrogen gas are passed to the anode through an external circuit. Oxygen then acquires these electrons at the anode to become $O^{2-}$ ions, which then bond with the $H_3O^+$ to produce water. The reaction process progresses continuously, allowing the electrical energy to be continuously extracted.

Though the theoretical electromotive force of a cell unit is 1.2 V, the polarization of the electrodes, reaction gas cross over (in which the fuel gas is transmitted through the polymer electrolyte to reach the air electrode), the ohmic resistance of both the electrode material and the collector material cause the voltage to drop, so that the output voltage in practice is about 0.6 V to 0.8 V. Therefore, several tens of cells must be stacked in series via separators to provide an output at a practical level.

As can be understood from the above principles of electricity generation, the large amount of $H^+$ ions present in the polymer electrolyte membrane makes the inside of the polymer electrolyte membrane and the vicinity of the electrodes overly acidic. Meanwhile, oxygen reduced at the anode is bonded to $H^+$ to produce water, though can form hydrogen peroxide depending upon the operational state of the cell. A separator intended to be exposed to this environment must possess electrochemical stability (corrosion resistance) in addition to conductivity and airtightness.

Most conventional separators for fuel cells are made of a graphite material and manufactured by mechanical working. While graphite has low electrical resistance and high corrosion resistance, it has low mechanical strength and is costly to process. In particular when a fuel cell for a vehicle is produced, the materials used to form the fuel cell must have high mechanical strength, and thus a graphite separator is unsuitable for use.

Recently, a method has been suggested for producing a graphite separator by forming a homogeneous mixture of graphite powder and resin into a separator shape and then baking it at high temperatures. In some cases, a mixture of graphite powder and resin is molded and used as a separator without being baked. In any of these cases, the resulting graphite separator is disadvantageous in terms of electrical resistance, gas-tightness, mechanical strength, and thermal conductivity.

Other than separators made of a carbon material, separators made of a metal have been investigated. Metal has particular advantages over carbon materials in terms of electrical resistance, airtightness, and mechanical strength. A separator of a metal can be thin and therefore lightweight. Metal is, however, more easily corroded than carbon materials. In addition, metal ions produced by corrosion may migrate into the polymer electrolyte membrane and lower the ion conductivity of the polymer electrolyte membrane. This can affect the electricity generation performance of the fuel cell.

In order to solve this problem, JP 11-162478 A, for example, proposes a method of improving the corrosion resistance of such a metal separator by plating the entire surface of the separator with a noble metal. The method is effective in terms of performance, but the manufacturing cost of the separator is raised by using this anti-corrosion coating so that the method is not practically applicable.

In order to reduce the cost, the use of a separator of a corrosion-resistant metal such as stainless steel and a nickel alloy has been considered. These metals allow a very thin oxide film to be generated on the surface and become passive. This restrains corrosion. However, the presence of the oxide film increases the contact electrical resistance on the surface, which then lowers the electricity generation performance of the fuel cell.

In order to resolve this disadvantage, a method of lowering the contact electrical resistance has been proposed, for example, by JP 10-308226 A. By the method, the surface of a separator made of a corrosion-resistant material to be in contact with the electrode is provided with a noble metal coating, or a metal or resin coating containing carbon particles. In order to reduce the weight of the fuel cell, a separator made of aluminum has also been investigated, for example, as disclosed by JP 10-255823 A).

Aluminum, however, has poor corrosion resistance, and therefore a separator made of aluminum must be coated with a corrosion-resistant metal to compensate for the poor corrosion resistance. The metal for the coating is usually a noble metal such as Au (gold). However, a noble metal such as Au is expensive, and therefore such an aluminum separator coated with a noble metal is inevitably very costly. In order to reduce the cost, the applied noble metal coating must be as thin as possible, though the thinner the noble metal coating is, the lower the provided corrosion resistance becomes. If the metal is too thin, sufficient durability in use is not secured.

Even if a metal coating with enough corrosion resistance is provided on a metal separator, the coating can be damaged at the time of assembling the fuel cell, which can cause corrosion of the substrate metal of the separator, and this can increase the contact resistance. Furthermore, metal ions produced by corrosion may migrate into the polymer electrolyte membrane and lower the ion conductivity of the polymer electrolyte membrane.

As described above, in a fuel cell unit having a metal separator, particularly an aluminum-alloy separator, the poor corrosion resistance of the separator degrades the electricity generation performance. Therefore, commercially available fuel cells cannot be produced at low cost using a metal separator.

OBJECT OF THE INVENTION

It is therefore an object of the present invention to provide a low-cost solid polymer electrolyte fuel cell unit including a metal separator that has a structure having high corrosion resistance and durability.

SUMMARY OF THE INVENTION

Eagerly studying and researching in view of the above object, the inventors have noted that the conductive coating on the metal separator is destroyed as the graphite collector is pressed against it. This causes corrosion of the coating and leads to degradation in the performance of the fuel cell. Based on this knowledge, the inventors have found that (1) the conductive coating on the metal separator can be protected to significantly reduce the corrosion of the metal separator and the electricity generation performance of the fuel cell can be maintained by providing a fibriform or foamed buffer layer having corrosion resistance, flexibility, conductivity, and gas permeability between the collector and the metal separator, or by providing the collector with a corrosion-resistant and conductive buffer coating rather than directly contacting the collector for the gas diffusion electrodes with the metal separator surface.

They have also found out that (2) particularly when the metal separator is made of aluminum or its alloy whose hardness is relatively low, or when the conductive coating on the metal separator is a very thin Au coating, the use of the above buffer layer can significantly restrain any degradation in the performance of the fuel cell. The inventors have accomplished the present invention based on the above discoveries.

More specifically, a solid polymer electrolyte fuel cell unit according to the present invention includes (a) a polymer electrolyte membrane, (b) a pair of gas-diffusible electrodes fixed at opposing surfaces of the polymer electrolyte membrane, (c) a pair of gas-diffusible porous conductive graphite collectors fixed in contact with the outer sides of the electrodes, (d) a pair of metal separators for introducing a fuel gas and an oxygen-containing gas to the electrodes separately from one another, and (e) a porous conductive buffer layer provided between the metal separator and the graphite collector and having flexibility and air permeability.

The buffer layer is preferably a woven or non-woven fabric of conductive fibers made of a metal, carbon, a conductive resin or a conductive ceramic or a foamed sheet having inter-communicating pores so as to have air permeability.

At least a surface of the buffer layer in contact with the metal separator is preferably coated with a metal or a conductive resin such that the porosity is not impeded. The conductive fiber forming the buffer layer is preferably coated with a metal or a conductive resin.

The metal coating the surface of the buffer layer or the conductive fiber forming the layer is preferably at least one metal selected from the group consisting of Au, Pt, Pd, Ru, Rh, Ir, Ag, Ti, Cu, Pb, Ni, Cr, Co, Fe and alloys thereof. The buffer layer preferably has a porosity in the range from 20% to 90%. The buffer layer preferably has a thickness in the range from 0.01 mm to 1.0 mm, more preferably from 0.05 mm to 0.2 mm.

At least a surface of the metal separator in contact with the buffer layer is preferably provided with a conductive coating made of at least one metal selected from the group consisting of Au, Pt, Ag, Pd, Ir, Ni, Cr and alloys thereof. The conductive coating on the surface of the metal separator preferably has a thickness in the range from 0.01 $\mu$m to 20 $\mu$m. The metal separator is preferably made of aluminum or its alloy.

According to one embodiment of the present invention, the graphite collector also serves as the buffer layer.

A preferable solid polymer electrolyte fuel cell unit according to the present invention includes (a) a polymer electrolyte membrane, (b) a pair of gas-diffusible electrodes fixed at opposing surfaces of the polymer electrolyte membrane, (c) a pair of gas-diffusible porous conductive graphite collectors fixed in contact with the outer sides of the electrodes, (d) a pair of separators made of aluminum or its alloy for introducing a fuel gas and an oxygen-containing gas to the electrodes separately from one another, and (e) a porous conductive buffer layer provided between the separator and the graphite collector and having flexibility and air permeability, the separator having at least a surface in contact with the buffer layer provided with a conductive coating having a thickness in the range from 0.01 $\mu$m to 20 $\mu$m.

Another solid polymer electrolyte fuel cell unit according to the present invention includes (a) a polymer electrolyte membrane, (b) a pair of gas-diffusible electrodes fixed at opposing surfaces of the polymer electrolyte membrane, (c) a pair of gas-diffusible porous members fixed in contact with the outer sides of the electrodes, and (d) a pair of metal separators for introducing a fuel gas and an oxygen-containing gas to the electrodes separately from one another. At least the porous member in contact with the metal separator is provided with a conductive coating made of a corrosion-resistant metal, a conductive resin, or a conductive ceramic.

The porous member is preferably made of a porous conductive graphite collector and is more preferably made of a woven or non-woven fabric piece of carbon fiber or a carbon paper sheet. The porous member is preferably made of a woven or non-woven fabric piece of resin fiber or natural fiber or a porous resin sheet.

Here, if the porous member has flexibility and serves as the buffer layer, the conductive coating must not have flexibility. On the contrary, if the porous member is hard material such as a usual carbon paper, the conductive coating should have flexibility and serve as the buffer layer.

DETAILED DESCRIPTION OF THE PREFERRED EMBODIMENTS

Figure 1:
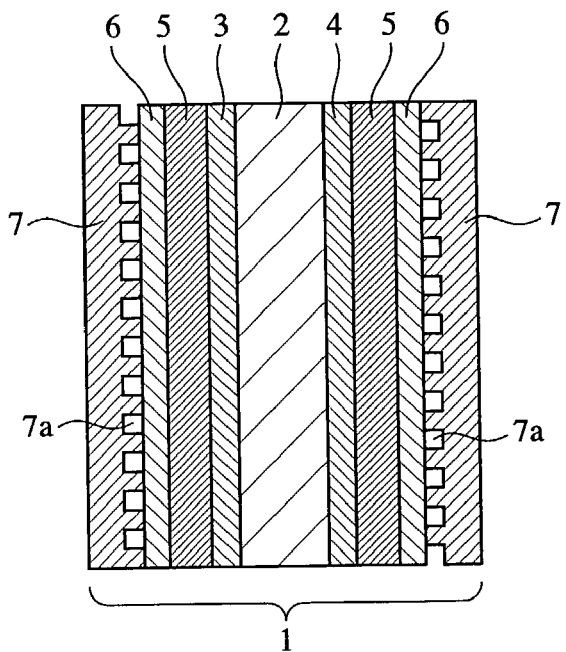
FIG. 1 is a schematic sectional view showing the configuration of layers arranged in a fuel cell unit according to one embodiment of the present invention.
Figure 3:
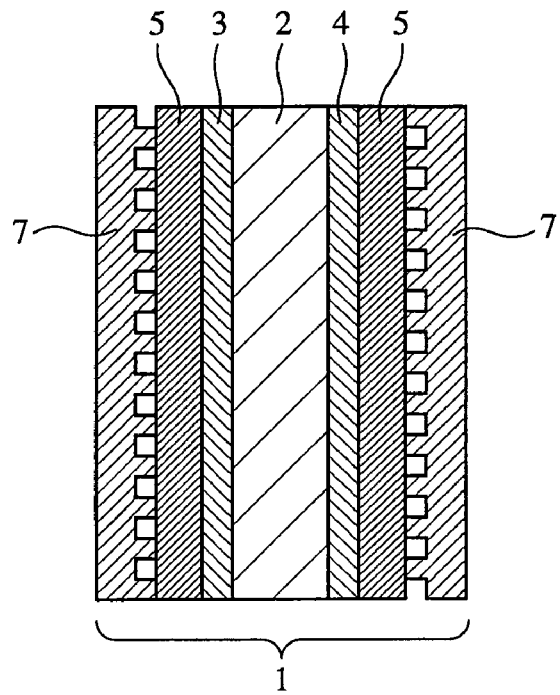
FIG. 3 is a schematic sectional view showing the configuration of layers arranged in a conventional fuel cell unit.

FIG. 1 is a view showing a solid polymer electrolyte fuel cell unit according to one embodiment of the present invention. FIG. 3 is a view showing a conventional solid polymer electrolyte fuel cell unit. The conventional solid polymer electrolyte fuel cell unit 1 shown in FIG. 3 includes a polymer electrolyte membrane (solid polymer electrolyte) 2, a cathode 3 and an anode 4 formed on the opposing sides of the membrane 2, collectors 5 provided at the electrodes 3 and 4, and metal separators 7 in contact with the respective collectors 5. In contrast, the solid polymer electrolyte fuel cell unit 1 shown in FIG. 1 includes a solid polymer electrolyte 2, a cathode 3 and an anode 4 formed on the opposing sides of the electrolyte 2, collectors 5 provided at the electrodes 3 and 4, buffer layers 6 provided at the respective outer sides of the collectors 5, and metal separators 7 in contact with the respective buffer layers 6. In this way, the cell unit 1 according to the present invention includes a fibriform or foamed sheet type buffer layer 6 having high flexibility, conductivity, and gas permeability between each collector 5 and each metal separator 7. In this way, the conductive coating of the metal separator 7 is not damaged by contact with the collector 5, and the corrosion resistance is maintained.

Figure 2:
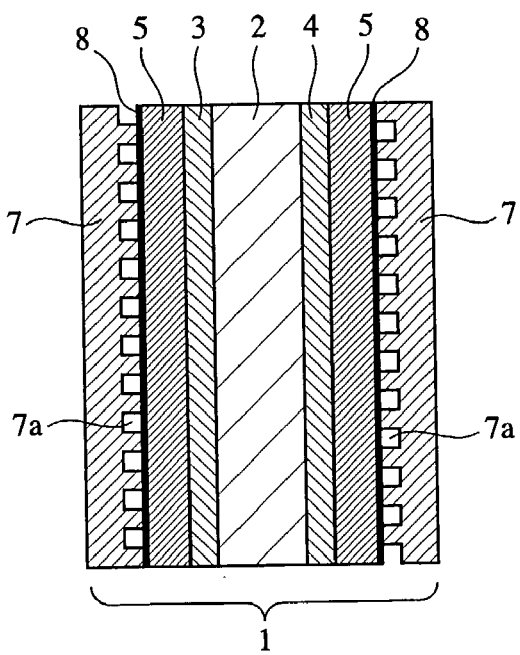
FIG. 2 is a schematic sectional view showing the configuration of layers arranged in a fuel cell unit according to another embodiment of the present invention.

FIG. 2 is a view showing a solid polymer electrolyte fuel cell unit according to another embodiment of the present invention. The cell unit 1 includes a solid polymer electrolyte 2, a cathode 3 and an anode 4 formed on the opposing sides of the electrolyte 2, porous members 5 provided at the electrodes 3 and 4, conductive coatings 8 provided at the respective outer sides of the collectors 5, and metal separators 7 in contact with the respective conductive coatings 8. Here, if the porous member 5 has flexibility and serves as the buffer layer, the conductive coating 8 must not have flexibility. On the contrary, if the porous member 5 is hard material such as a usual carbon paper, the conductive coating 8 should have flexibility and serve as the buffer layer. In this way, since the porous member 5 has flexibility or the conductive buffer coating 8 is formed at the surface where each of the porous members 5 contacts the metal separator 7, the metal separators 7 are not corroded.

Among the elements of the solid polymer electrolyte fuel cell, the solid polymer electrolyte 2, the cathode 3, and the anode 4 are the same as those of a conventional cell unit, and therefore will not be described in detail. A buffer layer, the separator, a porous conductive graphite collector and another porous member will be described in detail.

(1) Buffer Layer

The buffer layer must have high conductivity to electrically connect the metal separator 7 and the graphite collector 5. In order to alleviate any impact arising when the graphite collector 5 contacts the metal separator 7, the layer must also be highly flexible. In addition, as the layer is used for a fuel cell, it must also be highly conductive thermally and resistant to corrosion.

The buffer layer 6 that must have the above characteristics is preferably a woven or non-woven fabric of metal fiber, carbon fiber, or conductive resin fiber, or a foamed sheet of any of these conductive materials. The metal fiber may be a fiber of stainless steel, nickel, etc. Carbon fiber is preferably used because it is conductive and corrosion resistant. Commercially available carbon fiber may be used as the carbon fiber. The conductive resin fiber may be a fiber of metal-dispersed polyolefin-based resin, polyester-based resin, fluororesin, or the like. These kinds of fiber need only have an average diameter in the range from about 0.5 $\mu$m to about 20 $\mu$m.

When the fiber or foamed sheet for the buffer layer 6 is made of a non-conductive material such as a resin, the fiber or sheet may have its surface coated with a conductive material such as a metal and a conductive resin.

As can be seen from FIG. 1, the gas of the fuel cell is passed from the gas-flowing grooves 7a of the separators 7 to the interface between the respective electrodes 3, 4 and the polymer electrolyte 2, and therefore it must also pass through the buffer layers 6. As a result, the buffer layer 6 must have high air permeability. If the resistance of the gas passing through the buffer layers 6 is high, any large current output characteristic of the fuel cell can be affected. Therefore, the buffer layers 6 preferably have low resistance to the passage of gas. The porosity of the buffer layer 6 is preferably in the range from 20% to 90%, and more preferably from 30% to 80%. When the porosity of the buffer layer 6 is less than 20%, the buffer layer 6 has insufficient air permeability, and insufficient flexibility (shock absorbing capacity) to alleviate impact arising when the graphite collector and the metal separator contact with each other. When the porosity of the buffer layer 6 is more than 90%, the buffer layer 6 does not have sufficient mechanical strength, and the pressing force applied at the time of stacking the cell unit thins the buffer layer 6.

In general, the thickness of the buffer layer 6 is preferably in the range from 0.01 mm to 1.0 mm, and more preferably from 0.05 mm to 0.2 mm though this varies depending on the porosity. When the thickness of the buffer layer 6 is less than 0.01 mm, sufficient flexibility (shock absorbing capacity) is not obtained and it is difficult to install into the cell unit. When the thickness of the buffer layer 6 is more than 1.0 mm, not only is the electrical resistance value between the metal separator 7 and the graphite collector 5 too large, but also additionally the cell unit is too thick and the fuel cell stack cannot be made compact.

In order to increase the conductivity of the buffer layer 6, a surface of the buffer layer 6 (at least on the side in contact with the separator 7) or a surface of the conductive fiber forming the buffer layer 6 is preferably coated with at least one metal selected from the group consisting of Au, Pt, Pd, Ru, Rh, Ir, Ag, Ti, Cu, Pb, Ni, Cr, Co, Fe and alloys thereof. At least one metal selected from the group consisting of Au, Pt, Ir, Ag, Pb, Co and alloys thereof is particularly preferable in terms of conductivity and corrosion resistance.

The conductive coating for the buffer layer 6 preferably has a thickness in the range from 0.05 $\mu$m to 10 $\mu$m. When the thickness of the conductive coating is less than 0.05 $\mu$m, sufficient conductivity is not obtained. When the thickness of the conductive coating is more than 10 $\mu$m, the conductivity does not improve proportionately and the cost is simply raised. Note that the conductive coating for the buffer layer 6 may be formed by sputtering, physical vapor deposition, plating, or the like.

When the graphite collector 5 serves as the function of the buffer layer 6 as well, or vice versa, the structure of the fuel cell unit can be simplified, and the electrical resistance of the collector 5 can be reduced. In this case, without providing the buffer layer 6, the collector 5 is formed into the above-described structure.

(2) Separator

The separator may be made of a metal such as aluminum, an aluminum alloy, stainless steel, nickel, or copper. The metal separator 7 made of aluminum or its alloy can be electrically well connected with the buffer layer 6, improving the power density/weight, mechanical strength, and the like of the fuel cell unit.

Aluminum or its alloy, however, has poor corrosion resistance, and therefore at least the part of the surface of the separator 7 to be in contact with the buffer layer 6 is preferably coated with at least one metal selected from the group consisting of Au, Pt, Ag, Pd, Ir, Ni, Cr and alloys thereof. Among others, Au, Ag, Pt, or an alloy thereof is preferably used to form the coating, because high conductivity and corrosion resistance can be obtained.

The thickness of the conductive coating for the metal separator 7 is preferably in the range from 0.01 $\mu$m to 20 $\mu$m taking into account manufacturing cost and functionality of the coating. When the thickness of the conductive coating is less than 0.01 $\mu$m, sufficient corrosion resistance is not obtained. When the thickness of the conductive coating is more than 20 $\mu$m, the corrosion resistance does not improve proportionately and the cost is simply raised. The thickness of the conductive coating is more preferably in the range from 0.1 $\mu$m to 1.0 $\mu$m. Note that the conductive coating having such thickness may be formed by sputtering, physical vapor deposition, plating, or the like.

The metal separator 7 having the above structure is not only lightweight but also possesses high mechanical strength, conductivity, and thermal conductivity.

(3) Porous Conductive Graphite Collector

When there is the buffer layer in a cell unit, the graphite collector is preferably a woven or non-woven fabric of carbon fiber, or a carbon paper sheet. Carbon fiber is preferably used for its conductivity and corrosion resistance. Commercially available carbon fiber may be used for the carbon fiber. Carbon paper sheet is preferably produced by a paper making-graphitizing process or the like. By one example of the paper making-graphitizing process, paper made from cellulose fiber and using pulp waste water, polyvinyl alcohol or the like as a binder, or commercially available cellulose-based filter paper whose pore size is controlled is baked at a temperature in the range from 1000° C. to 1800° C. to produce the carbon paper.

(4) Porous Member

When there is no buffer layer in a cell unit, the porous member is provided between the electrode and the metal separator. Here, if the porous member has flexibility and serves as the buffer layer as well as collector, the conductive coating formed on the surface of the porous member in contact with the metal separator must not have flexibility. On the contrary, if the porous member is hard material such as a usual carbon paper, the conductive coating should have flexibility and serve as the buffer layer (hereinafter called "conductive buffer coating").

The porous member may be a porous conductive graphite collector or a woven or non-woven fabric of resin fiber or natural fiber, or a porous resin sheet. When the porous member is a graphite collector, the materials may be the same as those described in (3) Porous conductive graphite collector, and therefore will not be described.

When the porous member is a woven or non-woven fabric of resin fiber or natural fiber, or a porous resin sheet, the material of the porous member may be electrically conductive or non-conductive. The porous member is provided with a conductive coating, and therefore the porous member can serve as a porous conductive collector regardless of whether the material of the porous member is conductive or not. The conductive resin may be a metal-dispersed polyolefin-based resin, a metal-dispersed polyester-based resin, a metal-dispersed fluororesin, carbon fiber, or the like. The non-conductive resin may be a nylon-based resin, a polypropylene-based resin, or a polyester-based resin, or the like. The natural fiber may be cellulose or the like. The average size of the fiber needs only be in the range from 0.5 $\mu$m to 20 $\mu$m.

The porous member itself must have good air permeability to pass the gas of the fuel cell. When there is no buffer layer in particular, the porous member must also have high flexibility so that the separator does not corrode. More specifically, the porosity of the porous member is preferably in the range from 20% to 90%, and more preferably from 30% to 80%. The thickness of the porous member is preferably in the range from 0.01 mm to 1.0 mm, and more preferably from 0.05 mm to 0.2 mm. If the porosity and thickness of the porous member fall within the range, the porous member serves as the buffer layer.

The conductive coating is provided at least at the porous member in contact with the metal separator so that the porosity is not impeded, and is made of a metal, a conductive resin, or a conductive ceramic. When the conductive coating is made of a metal, the metal is preferably at least one metal selected from the group consisting of Au, Pt, Pd, Ru, Rh, Ir, Ag, Ti, Cu, Pb, Ni, Cr, Co, and alloys thereof. The metal particularly preferable in terms of conductivity and corrosion resistance is at least one metal selected from Au, Pt, Ir, Ag, Pb, Co and alloys thereof. The conductive resin used to form the conductive coating may be, for example, a polyolefin-based resin, a polyester-based resin, or a fluororesin each having a metal dispersed inside. The conductive ceramic may be, for example, indium tin oxide (ITO).

If the porous member serves as the buffer layer, the thickness of the conductive coating is preferably in the range from 0.5 $\mu$m to 50 $\mu$m. When the thickness of the conductive coating is less than 0.5 $\mu$m, sufficient conductivity and corrosion resistance cannot be obtained. When the thickness of the conductive coating is more than 50 $\mu$m, the conductivity and corrosion resistance do not improve proportionately. On the contrary, the porosity of the conductive buffer coating is preferably in the range from 20% to 90%, and more preferably from 30% to 80%. In general, the thickness of the conductive buffer layer is preferably in the range from 5 $\mu$m to 100 $\mu$m though this varies depending on the porosity. When the thickness of the conductive buffer layer is less than 5 $\mu$m, sufficient flexibility (shock absorbance capacity) is not obtained. When the thickness of the conductive buffer layer is more than 100 $\mu$m, the flexibility does not improve proportionately and the cost is simply raised. The conductive coating is preferably formed by sputtering, vacuum vapor deposition, electroplating, or electroless plating.

The present invention will be described in more detail with reference to Examples, though it is not limited to these Examples.

EXAMPLE 1

An aluminum plate as thick as 5 mm was pressed and formed into a separator shape for a fuel cell. The aluminum separator had its surface etched, cleaned, and then sequentially subjected to a zincate conversion process, Ni electroless plating, and Au electroless plating. In this way, a Ni coating as thick as 1 μm and an Au coating as thick as 0.4 μm were formed on the surface of the separator in this order. As shown in FIG. 1, from the outer side, a pair of aluminum separators, a pair of carbon cloth pieces for buffer layers having a thickness of 0.2 mm and a porosity of about 80%, a pair of carbon paper sheets for collectors, and a polymer electrolyte membrane made of Nafion® as thick as 170 μm were assembled and the separator was fastened by bolts to form a cell unit. Note that a hydrogen electrode and an air electrode each containing a Pt catalyst were formed on the opposing surfaces of the polymer electrolyte membrane.

Figure 4:
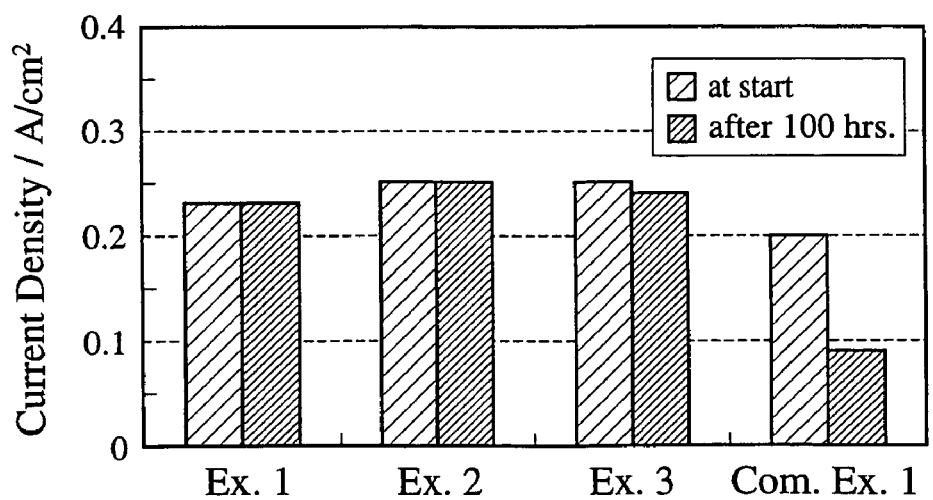
FIG. 4 is a graph showing in comparison the electricity generation performance before and after 100-hour period of electricity generation in Examples 1 to 3 and Comparative Example 1.

The output current of the fuel cell unit was measured at a temperature of 60° C. and at a voltage of 0.65 V. Then, the cell unit was operated to generate electricity for 100 hours and the output current at a voltage of 0.65 V was again measured. The results are shown in FIG. 4. As can be seen from the results of this Example, the output current hardly changed after the 100-hour electricity generation period.

EXAMPLE 2

An aluminum plate as thick as 5 mm was pressed and formed into a separator shape for a fuel cell. The aluminum separator had its surface etched, cleaned, and then sequentially subjected to a zincate conversion process, Ni electroless plating, and Au electroless plating. In this way, a Ni coating as thick as 1 μm and an Au coating as thick as 0.4 μm were formed on the surface of the separator in this order. A carbon cloth piece having a thickness of 0.2 mm and a porosity of about 80% was provided with an Au coating about as thick as 0.1 μm, and thus a collector buffer material was obtained. This was mounted between the separator and the collector as shown in FIG. 1. The fuel cell unit was assembled in the same manner as in Example 1 except for those described above.

The output current of the fuel cell unit was measured at a temperature of 60° C. and at a voltage of 0.65 V. Then, the cell unit was operated to generate electricity for 100 hours and the output current at 0.65 V was again measured. The results are shown in FIG. 4. As can be seen from the results of this Example, the output current changed only very slightly after the 100-hour period of electricity generation, and contact electrical resistance was reduced between the collector and the buffer layer and between the buffer layer and the separator. This slightly increased the output current as compared to Example 1.

EXAMPLE 3

Using an aluminum plate as thick as 5 mm, a separator for a fuel cell was produced in the same manner as in Example 1, with a Ni coating and an Au coating formed on the surface of the separator. A non-woven fabric piece (cotton type sheet) of stainless steel fiber having a thickness of about 0.2 mm and a porosity of 70% was provided with a Au coating having a thickness of about 0.05 μm by sputtering to obtain a collector buffer material. This was mounted between the separator and the collector of the fuel cell as shown in FIG. 1. The fuel cell unit was assembled in the same manner as in Example 1 except for those described above.

The output current of the fuel cell unit was measured at a temperature of 60° C. and at a voltage of 0.65 V. The cell unit was operated to generate electricity for 100 hours, and the output current was again measured at 0.65 V. The results are shown in FIG. 4. As can be seen from the results of this Example, the current change after the 100-hour period of electricity generation was very small.

COMPARATIVE EXAMPLE 1

An aluminum plate as thick as 5 mm was formed into a separator for a fuel cell in the same manner as in Example 1, with a Ni coating and an Au coating formed on the surface of the separator. As shown in FIG. 3, the separator was directly contacted to a carbon paper sheet serving as a collector for the hydrogen electrode and the air electrode, and thus a fuel cell unit was assembled.

The output current of the fuel cell unit was measured at a temperature of 60° C. and a voltage of 0.65 V. The cell unit was operated to generate electricity for 100 hours, and the output current was again measured at 0.65 V. The results are shown in FIG. 4. In this Comparative Example, the output current significantly dropped after the 100-hour period of electricity generation.

EXAMPLE 4

An aluminum plate as thick as 5 mm was pressed and formed into a separator for a fuel cell. The surface of the aluminum separator to be in contact with the collector was plated with a Ni coating as thick as 5 μm, while an alloy coating of 95% by mass of Ag and 5% by mass of Au in a thickness of about 2 μm was plated thereon. A carbon cloth piece having a thickness of about 0.15 mm was immersed in a PTFE solution and then treated at a temperature of 280° C. to provide water repellency. The carbon cloth piece thus obtained was mounted as a collector buffer material between the separator and the collector of the fuel cell as shown in FIG. 1. The fuel cell unit was assembled in the same manner as in Example 1 except for those described above.

Figure 5:
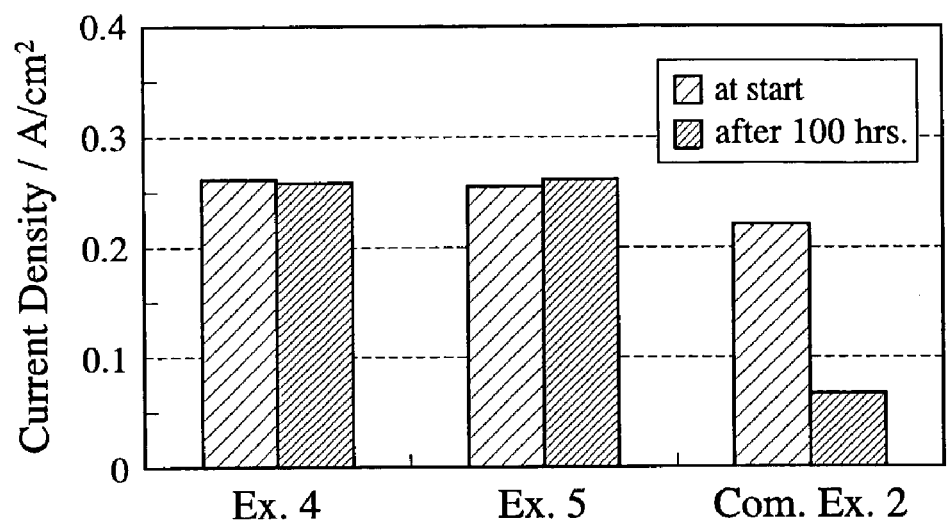
FIG. 5 is a graph showing in comparison the electricity generation performance before and after 100-hour period of electricity generation in Examples 4 and 5 and Comparative Example 2.

The output current of the fuel cell unit was measured at a temperature of 60° C. and at a voltage of 0.65 V. Then, the cell unit was operated to generate electricity for 100 hours and the output current at 0.65 V was again measured. The results are shown in FIG. 5. As can be seen from the results of this Example, the output current change after the 100-hour period of electricity generation was very small, not affected by the corrosion of the separator.

EXAMPLE 5

Using an aluminum plate as thick as 5 mm, a separator for a fuel cell was produced in the same manner as in Examples above. The surface of the aluminum separator to be in contact with the collector was provided with an Au coating of a thickness of 1 μm by electroless plating. A carbon paper sheet having a thickness of 250 μm and a porosity of about 50% was formed as the collector to be in contact with the electrode, and only the surface of the collector to be in contact with the separator was provided with an Ag coating as thick as 0.7 μm by sputtering. The collector obtained in this way was thermally combined with the electrode, so that an electrode-electrolyte membrane combined body for the fuel cell was produced. The electrode-electrolyte membrane combined body and the aluminum separator were incorporated into the fuel cell unit as shown in FIG. 2. In this example, the collector served as the buffer layer, too.

The output current of the fuel cell unit was measured at a temperature of 60° C. and at a voltage of 0.65 V. Then, the cell unit was operated to generate electricity for 100 hours and the output current at 0.65 V was again measured. The results are shown in FIG. 5. As can be seen from the results of this Example, the output current change after the 100-hour period of electricity generation was very small, not affected by the corrosion of the separator.

COMPARATIVE EXAMPLE 2

Using an aluminum plate as thick as 5 mm, a separator for a fuel cell was produced in the same manner as in Example 5. The surface of the aluminum separator was provided with an Au coating having a thickness of 1 μm. As shown in FIG. 3, the separator was directly contacted to a carbon paper sheet serving as a collector for the hydrogen electrode and the air electrode of the fuel cell. In this way, a fuel cell unit was assembled.

The output current of the fuel cell unit was measured at a temperature of 60° C. and at a voltage of 0.65 V. Then, the cell unit was operated to generate electricity for 100 hours and the output current at 0.65 V was again measured. The results are shown in FIG. 5. As can be seen from the results of this Example, the output current was significantly dropped after the 100-hour period of electricity generation.

EXAMPLE 6

An aluminum plate as thick as 5 mm was pressed and formed into a separator shape for a fuel cell. The aluminum separator had its surface etched, cleaned, and then sequentially subjected to a zincate conversion process, Ni electroless plating, and Au electroless plating. The separator surface was thus provided with a Ni coating having a thickness of 1 μm and an Au coating having a thickness of 0.4 μm in this order. A carbon paper sheet for the collector had a thickness of 180 μm and a porosity of about 60%. Only the surface of the carbon paper sheet in contact with the separator was provided with an Ag coating as a conductive coating, and having a thickness of 1 μm by sputtering. The collector and the separator were incorporated into a fuel cell unit having the structure shown in FIG. 2.

Figure 6:
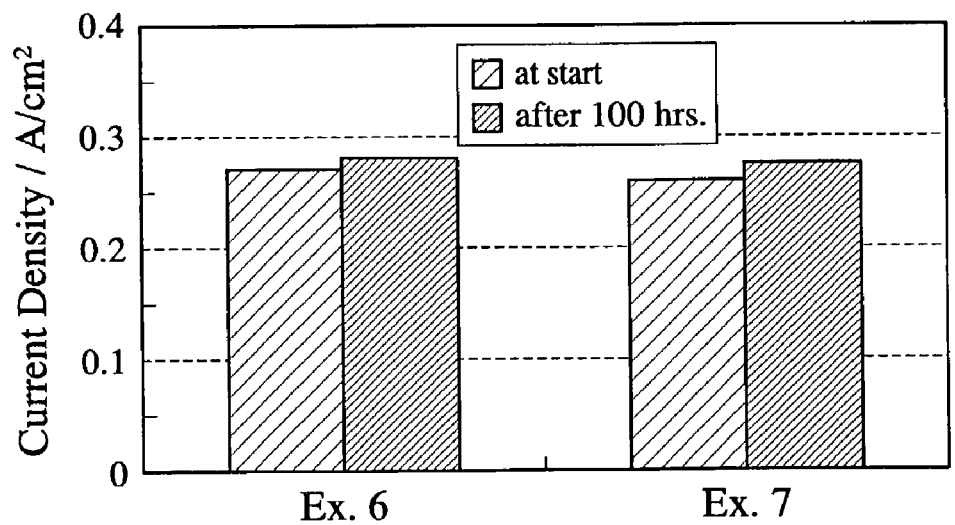
FIG. 6 is a graph showing in comparison the electricity generation performance before and after 100-hour period of electricity generation in Examples 6 and 7.

The output current of the fuel cell unit was measured at a temperature of 60° C. and at a voltage of 0.65 V. Then, the cell unit was operated to generate electricity for 100 hours and the output current at 0.65 V was again measured. The results are shown in FIG. 6. As can be seen from the results of this Example, the output current did not drop after the 100-hour period of electricity generation.

EXAMPLE 7

An aluminum plate as thick as 5 mm was pressed and formed into a separator shape for a fuel cell. The aluminum separator had its surface etched, cleaned, and then sequentially subjected to a zincate conversion process, Ni electroless plating, and Au electroless plating. The separator surface was thus provided with a Ni coating having a thickness of 1 μm and an Au coating having a thickness of 0.4 μm in this order. A nylon cloth piece having an average fiber diameter of about 5 μm, a thickness of 100 μm and a porosity of 50% had both its surfaces provided with an Ag coating as a conductive coating, and having a thickness of 2 μm by sputtering. In this way, a porous conductive collector was produced. The collector and the separator were incorporated into a fuel cell unit having the structure shown in FIG. 2.

The output current of the fuel cell unit was measured at a temperature of 60° C. and at a voltage of 0.65 V. Then, the cell unit was operated to generate electricity for 100 hours and the output current at 0.65 V was again measured. The results are shown in FIG. 6. As can be seen from the results of this Example, the output current did not drop after the 100-hour period of electricity generation.

As seen in the foregoing, the solid polymer electrolyte fuel cell unit according to the present invention includes a buffer layer having electrical conductivity, air permeability, and flexibility, and mounted between a metal separator and a collector. In such a fuel cell unit, the metal separator can be prevented from corroding, so that the electricity generating performance of the fuel cell can be maintained for a long period. The metal separator can also be effectively prevented from corroding by forming a conductive buffer coating at the porous member such as the collector.

What is claimed is:

1. A solid polymer electrolyte fuel cell unit, comprising:
   (a) a polymer electrolyte membrane;
   (b) a pair of gas-diffusible electrodes fixed at opposing surfaces of said polymer electrolyte membrane;
   (c) a pair of gas-diffusible, porous, conductive graphite collectors fixed in contact with the outer sides of said electrodes;
   (d) a pair of metal separators for introducing a fuel gas and an oxygen-containing gas to said electrodes separately from one another; and
   (e) a porous conductive buffer layer provided between said metal separator and said graphite collector and having flexibility and air permeability.

2. The solid polymer electrolyte fuel cell unit according to claim 1, wherein said buffer layer is a woven or non-woven fabric of conductive fiber of a metal, carbon, or a conductive resin, or a foamed sheet having inter-communicating pores so as to have air permeability.

3. The solid polymer electrolyte fuel cell unit according to claim 1, wherein at least a surface of said buffer layer in contact with said metal separator is coated with a metal or a conductive resin such that the porosity is not impeded.

4. The solid polymer electrolyte fuel cell unit according to claim 3, wherein the metal coating the surface of said buffer layer is at least one metal selected from the group consisting of Au, Pt, Pd, Ru, Rh, Ir, Ag, Ti, Cu, Pb, Ni, Cr, Co, Fe and alloys thereof.

5. The solid polymer electrolyte fuel cell unit according to claim 1, wherein said buffer layer is a woven or non-woven fabric of conductive fiber, and said conductive fiber is coated with a metal or a conductive resin.

6. The solid polymer electrolyte fuel cell unit according to claim 5, wherein the metal coating said conductive fiber is at least one metal selected from the group consisting of Au, Pt, Pd, Ru, Rh, Ir, Ag, Ti, Cu, Pb, Ni, Cr, Co, Fe and alloys thereof.

7. The solid polymer electrolyte fuel cell unit according to claim 1, wherein said buffer layer has porosity in the range from 20% to 90%.

8. The solid polymer electrolyte fuel cell unit according to claim 1, wherein said buffer layer has a thickness in the range from 0.01 mm to 1.0 mm.

9. The solid polymer electrolyte fuel cell unit according to claim 1, wherein at least a surface of said metal separator in contact with said buffer layer is provided with a conductive coating made of at least one metal selected from the group consisting of Au, Pt, Ag, Pd, Ir, Ni, Cr and alloys thereof.

10. The solid polymer electrolyte fuel cell unit according to claim 9, wherein said conductive coating on the surface of said metal separator has a thickness in the range from 0.01 μm to 20 μm.

11. The solid polymer electrolyte fuel cell unit according to claim 1, wherein said metal separator is made of aluminum or an aluminum alloy.

12. A solid polymer electrolyte fuel cell unit, comprising:
(a) a polymer electrolyte membrane;
(b) a pair of gas-diffusible electrodes fixed at opposing surfaces of said polymer electrolyte membrane;
(c) a pair of gas-diffusible, porous members fixed in contact with the outer sides of said electrodes; and
(d) a pair of metal separators for introducing a fuel gas and an oxygen-containing gas to said electrodes separately from one another, at least said porous member in contact with said metal separator being provided with a conductive coating made of a corrosion-resistant metal, a conductive resin, or a conductive ceramic.

13. The solid polymer electrolyte fuel cell unit according to claim 12, wherein said porous member is a woven or non-woven fabric of carbon fiber, or a carbon paper sheet.

14. The solid polymer electrolyte fuel cell unit according to claim 12, wherein said porous member is a woven or non-woven fabric of resin fiber or natural fiber, or a porous resin sheet.

15. The solid polymer electrolyte fuel cell unit according to claim 12, wherein said conductive coating has a thickness in the range from 0.5 μm to 50 μm.

16. The solid polymer electrolyte fuel cell unit according to claim 12, wherein said conductive buffer coating is made of at least one metal selected from the group consisting of Au, Pt, Pd, Ru, Rh, Ir, Ag, Ti, Cu, Pb, Ni, Cr, Co, Fe and alloys thereof.

* * * * *